(12) United States Patent
Novak, Jr. et al.

(10) Patent No.: US 8,899,844 B2
(45) Date of Patent: Dec. 2, 2014

(54) OPTICAL DEVICE

(75) Inventors: John Novak, Jr., San Jose, CA (US); Michael W. Sasnett, Los Altos, CA (US)

(73) Assignee: AMS Research Corporation, Minnetonka, MN (US)

( * ) Notice: Subject to any disclaimer, the term of this patent is extended or adjusted under 35 U.S.C. 154(b) by 1022 days.

(21) Appl. No.: 12/627,247

(22) Filed: Nov. 30, 2009

(65) Prior Publication Data

US 2010/0135617 A1  Jun. 3, 2010

Related U.S. Application Data

(60) Provisional application No. 61/118,857, filed on Dec. 1, 2008.

(51) Int. Cl.
| | | |
|---|---|---|
| *G02B 6/36* | (2006.01) | |
| *G02B 6/02* | (2006.01) | |
| *G02B 6/26* | (2006.01) | |
| G02B 6/24 | (2006.01) | |

(52) U.S. Cl.
CPC ............... *G02B 6/262* (2013.01); *G02B 6/241* (2013.01); *G02B 6/02052* (2013.01)
USPC ........................................... 385/77; 385/123

(58) Field of Classification Search
CPC .. G02B 6/3821; G02B 6/3825; G02B 6/3849; G02B 6/3893; G02B 6/02; G02B 6/29377; G02B 6/03611; G02B 6/03627; G02B 6/03644
USPC ................................................... 385/77, 123
See application file for complete search history.

(56) References Cited

U.S. PATENT DOCUMENTS

| | | | |
|---|---|---|---|
| 3,933,455 A | * | 1/1976 | Chown ............................ 65/429 |
| 4,381,882 A | * | 5/1983 | Sabine ............................ 385/77 |
| 4,669,467 A | | 6/1987 | Willett et al. |
| 4,672,961 A | | 6/1987 | Davies |
| 4,732,448 A | | 3/1988 | Goldenberg ..................... 385/33 |
| 4,740,047 A | | 4/1988 | Abe et al. |
| 5,061,265 A | | 10/1991 | Abela et al. |
| 5,074,632 A | | 12/1991 | Potter |
| 5,242,438 A | | 9/1993 | Saadatmanesh et al. |

(Continued)

FOREIGN PATENT DOCUMENTS

| | | |
|---|---|---|
| EP | 0689797 A1 | 1/1996 |
| JP | 60250322 | 12/1985 |

(Continued)

OTHER PUBLICATIONS

U.S. Appl. No. 12/517,883, filed Jun. 5, 2009.

(Continued)

*Primary Examiner* — Jerry Blevins
(74) *Attorney, Agent, or Firm* — Westman, Champlin & Koehler, P.A.

(57) ABSTRACT

One embodiment of an optical device comprises a fiber cap, an optical fiber and a bond between the fiber cap and the optical fiber. The fiber cap comprises a cap body having a closed distal end and a bore having a tapered section. The optical fiber comprises cladding surrounding a core. A distal end of the cladding comprises a tapered section that engages the tapered section of the bore.

23 Claims, 7 Drawing Sheets

(56) References Cited

U.S. PATENT DOCUMENTS

| | | | |
|---|---|---|---|
| 5,269,777 A | 12/1993 | Doiron et al. | |
| 5,292,320 A | 3/1994 | Brown et al. | |
| 5,343,543 A | 8/1994 | Novak, Jr. et al. | |
| 5,354,294 A | 10/1994 | Chou | |
| 5,428,699 A | 6/1995 | Pon | |
| 5,486,171 A | 1/1996 | Chou | |
| 5,495,541 A | 2/1996 | Murray et al. | |
| 5,496,307 A | 3/1996 | Daikuzono | |
| 5,496,308 A | 3/1996 | Brown et al. | |
| 5,498,260 A | 3/1996 | Rink et al. | |
| 5,509,917 A | 4/1996 | Cecchetti et al. | |
| 5,512,078 A | 4/1996 | Griffin | |
| 5,530,780 A | 6/1996 | Ohsawa | |
| 5,537,499 A | 7/1996 | Brekke | |
| 5,562,657 A | 10/1996 | Griffin | |
| 5,571,099 A | 11/1996 | Purcell, Jr. et al. | |
| 5,638,483 A * | 6/1997 | Konwitz | 385/38 |
| 5,695,583 A | 12/1997 | van den Bergh et al. | |
| 5,807,390 A | 9/1998 | Fuller et al. | |
| 5,824,005 A | 10/1998 | Motamedi et al. | |
| 6,246,817 B1 | 6/2001 | Griffin | |
| 6,270,492 B1 | 8/2001 | Sinofsky | |
| 6,284,085 B1 | 9/2001 | Gwo | |
| 6,398,778 B1 | 6/2002 | Gu et al. | |
| 6,522,806 B1 | 2/2003 | James, IV et al. | |
| 6,626,582 B2 * | 9/2003 | Farrar et al. | 385/53 |
| 6,687,436 B2 | 2/2004 | Griffin | 385/43 |
| 6,712,526 B1 | 3/2004 | Fleenor | 385/78 |
| 6,829,411 B2 | 12/2004 | Easley | |
| 6,986,764 B2 | 1/2006 | Davenport et al. | |
| 7,909,817 B2 | 3/2011 | Griffin et al. | 606/13 |
| 2005/0165279 A1 | 7/2005 | Adler et al. | |
| 2006/0291061 A1 | 12/2006 | Iyama et al. | |
| 2007/0106286 A1 | 5/2007 | Harschack et al. | 606/17 |
| 2007/0189683 A1* | 8/2007 | Griffin | 385/123 |
| 2008/0287936 A1 | 11/2008 | Stinson et al. | |
| 2011/0002584 A1* | 1/2011 | Griffin | 385/43 |
| 2011/0038580 A1 | 2/2011 | Griffin | 385/33 |

FOREIGN PATENT DOCUMENTS

| | | |
|---|---|---|
| JP | 62011820 | 1/1987 |
| JP | 03111040 | 5/1991 |
| JP | 10155805 | 6/1998 |
| JP | 2001346891 | 12/2001 |
| WO | 2008073263 A1 | 6/2008 |
| WO | 2008073264 A2 | 6/2008 |

OTHER PUBLICATIONS

International Search Report and Written Opinion of PCT/US2007/024964, filed Dec. 6, 2007.
U.S. Appl. No. 61/118,857, filed Dec. 1, 2008.
International Search Report and Written Opinion of PCT/US2007/024963, filed Dec. 6, 2007.
U.S. Appl. No. 12/517,879, filed Jun. 5, 2009.

* cited by examiner

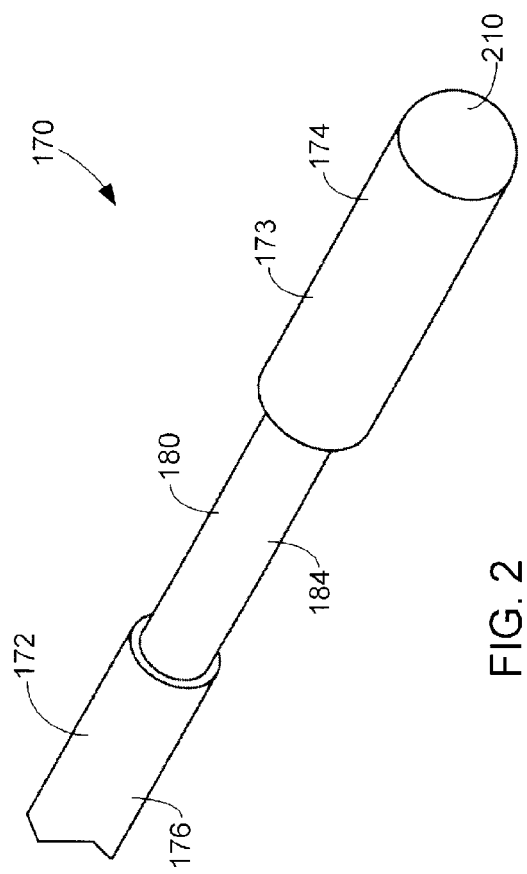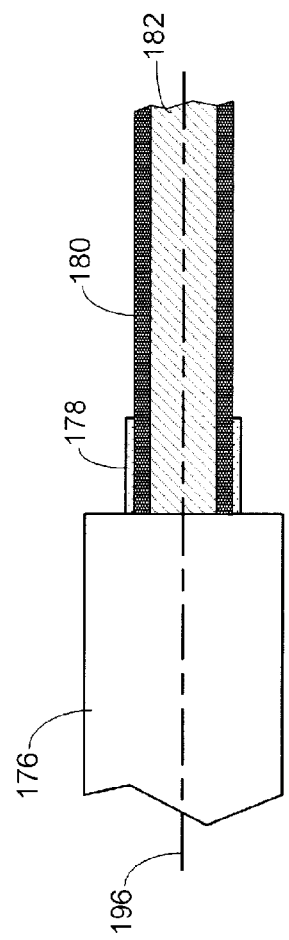
FIG. 2
FIG. 3

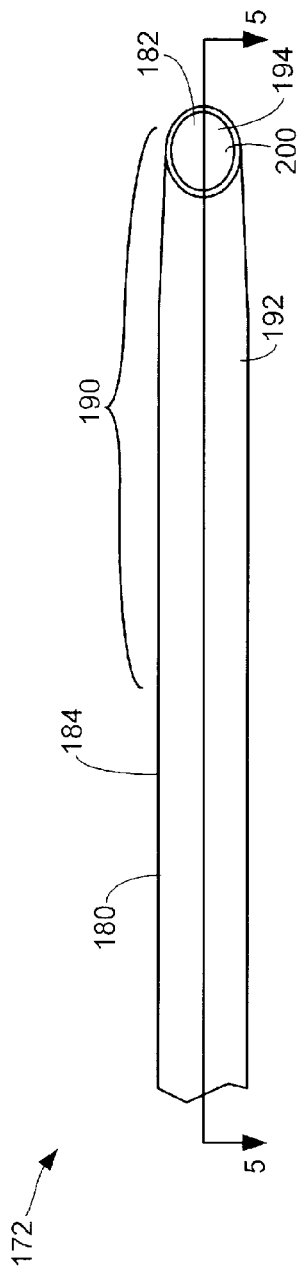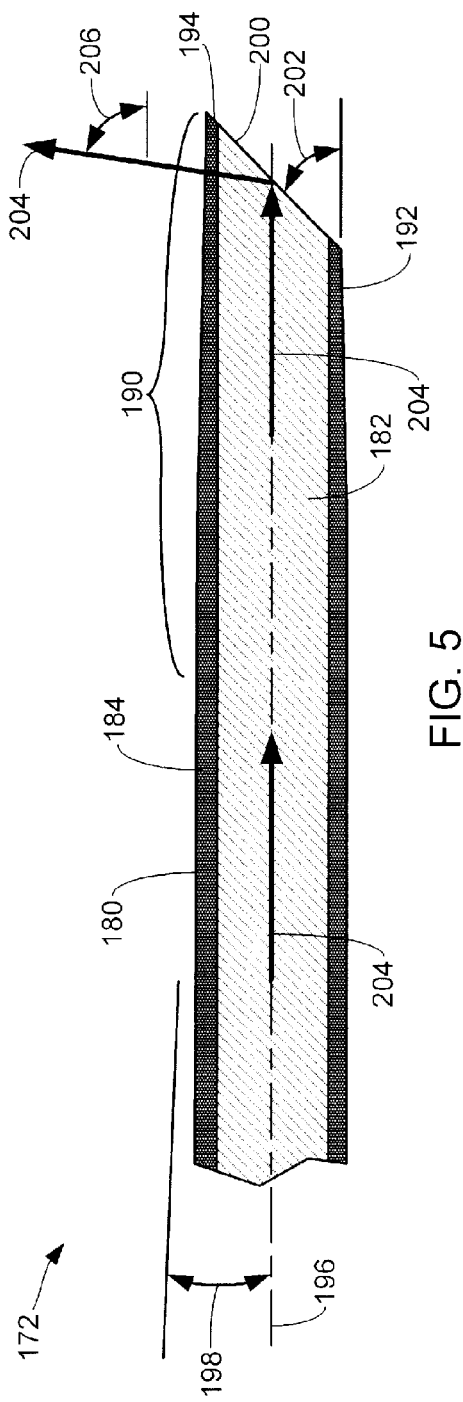

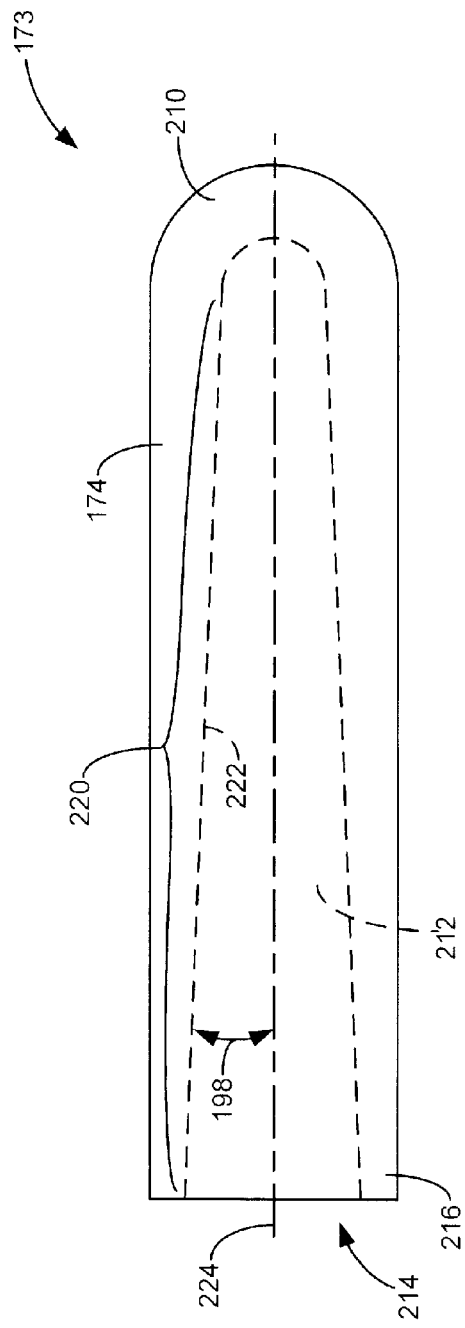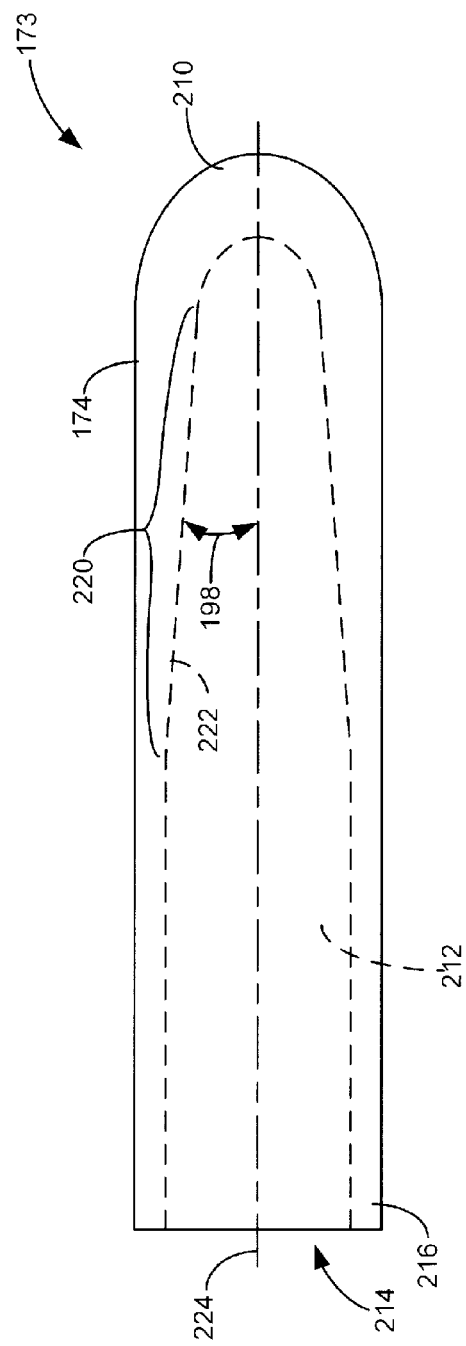

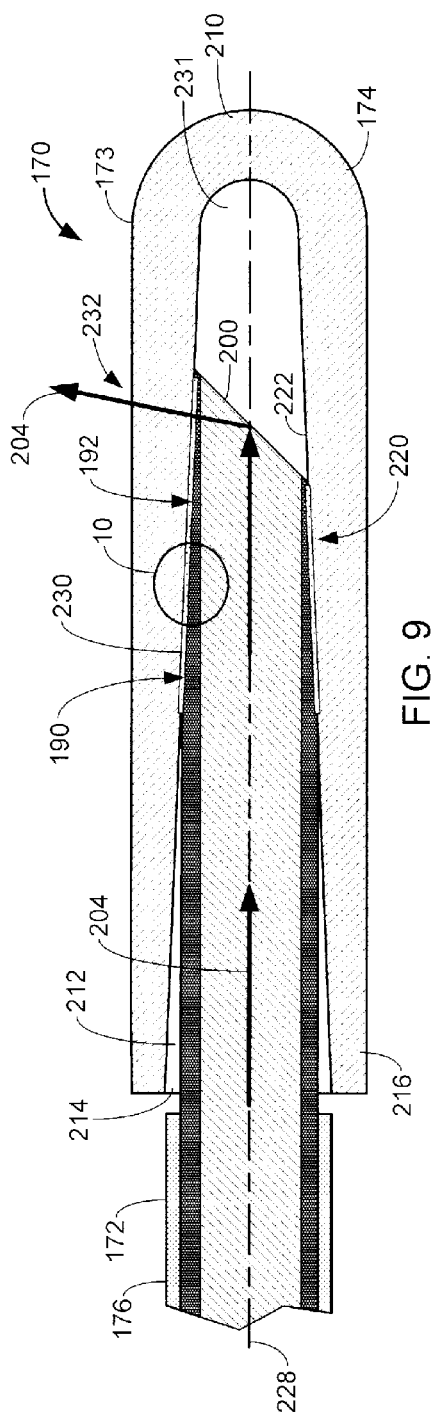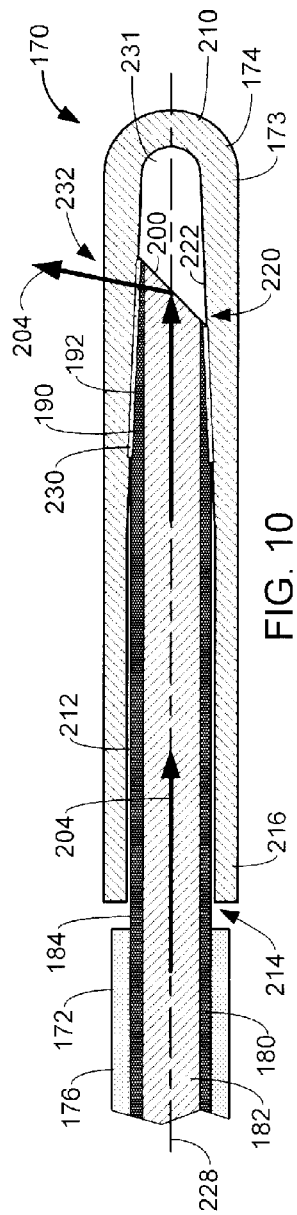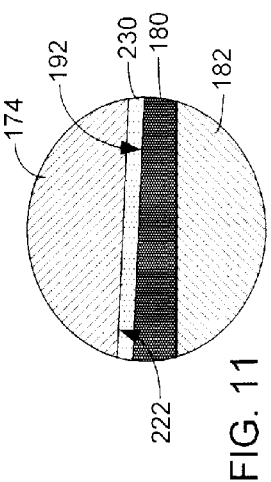

OPTICAL DEVICE

CROSS-REFERENCE TO RELATED APPLICATION

The present application is based on and claims the benefit of U.S. provisional patent application Ser. No. 61/118,857, filed Dec. 1, 2008, the content of which is hereby incorporated by reference in its entirety.

FIELD

Embodiments of the present invention generally relate to optical devices and, more specifically to an optical device that is configured to discharge an output laser generated by a laser system.

BACKGROUND

High power laser systems have a broad range of applications throughout the scientific, industrial and medical fields. Laser systems generally include a pump module, a gain medium and a laser resonator. The pump module includes laser diodes or bars that generate pump energy. The gain medium absorbs the pump energy and emits laser light responsive to the absorbed energy. The laser resonator operates to generate a harmonic of the laser light. The laser light is discharged through an optical device onto the desired target.

SUMMARY

Embodiments of the invention relate to an optical device configured to discharge laser light generated by a laser system. One embodiment of the optical device comprises a fiber cap, an optical fiber and a bond between the fiber cap and the optical fiber. The fiber cap comprises a cap body having a closed distal end and a bore having a tapered section. The optical fiber comprises cladding surrounding a core. A distal end of the cladding comprises a tapered section that engages the tapered section of the bore.

Another embodiment is directed to a fiber optic cap comprising a cap body having a closed distal end and a bore. The bore is configured to receive a distal end of an optical fiber and has a tapered section defined by a conically shaped interior wall aligned at a taper angle relative to a central axis of the bore. In one embodiment, the taper angle is less than 15 degrees.

Another embodiment of the invention is directed to a method of forming an optical device. In the method, a fiber cap comprising a cap body having a closed distal end is provided. A bore is formed in the cap body having a tapered section defined by a conically shaped interior surface aligned at a taper angle relative to a central axis of the bore. An optical fiber comprising cladding surrounding a core is provided and a tapered section is formed in a distal end of the cladding. The tapered section of the cladding is defined by a conically shaped exterior surface aligned at a taper angle relative to a central axis of the optical fiber. The distal end of the optical fiber is inserted into the bore of the cap body, wherein the tapered section of the bore overlaps the tapered section of the cladding. The fiber cap is then bonded to the optical fiber by bonding a portion of the interior surface to the exterior surface.

This Summary is provided to introduce a selection of concepts in a simplified form that are further described below in the Detailed Description. This Summary is not indented to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 2 is an oblique view of the optical device in accordance with embodiments of the invention.

FIG. 3 is a partial side partial side cross-sectional view of an exemplary optical fiber found in the prior art.

FIG. 4 is a side plan view of an exemplary optical fiber in accordance with embodiments of the invention.

FIG. 5 is a side cross-sectional view of the optical fiber of FIG. 4 taken generally along line 5-5.

FIGS. 7 and 8 are side plan views of a fiber cap in accordance with embodiments of the invention.

FIGS. 9 and 10 are side cross-sectional views of the optical device in accordance with embodiments of the invention.

FIG. 11 is a magnified view of the portion of the optical device within circle 10 of FIG. 9.

DETAILED DESCRIPTION OF ILLUSTRATIVE EMBODIMENTS

Figure 1:
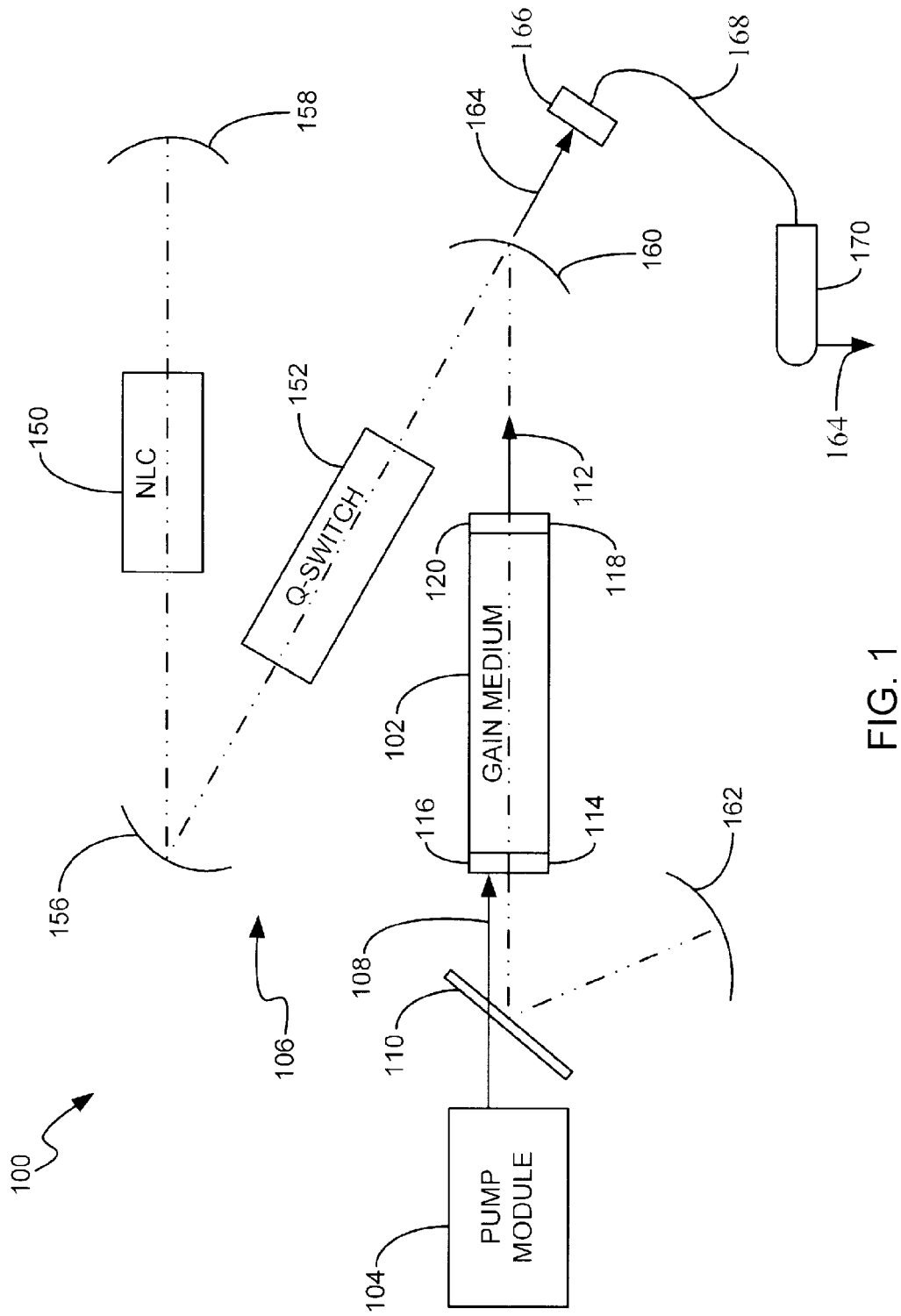
FIG. 1 is a schematic illustration of a laser system in accordance with embodiments of the invention.

FIG. 1 is a schematic illustration of a laser system 100 in accordance with embodiments of the invention. The laser system 100 includes a gain medium 102, a pump module 104 and a laser resonator 106. In one embodiment, the gain medium 102 is a doped crystalline host that is configured to absorb pump energy 108 generated by the pump module 104 having a wavelength that is within an operating wavelength (i.e., absorption spectra) range of the gain medium 102. In one embodiment, the gain medium 102 is end-pumped by the pump energy 108, which is transmitted through a folding mirror 110 that is transmissive at the wavelength of the pump energy 108. The gain medium 102 absorbs the pump energy 108 and responsively outputs laser light 112.

The gain medium 102 is water cooled in exemplary embodiments, along the sides of the host. In one embodiment, the gain medium 102 includes an undoped end cap 114 bonded on a first end 116 of the gain medium 102, and an undoped end cap 118 bonded on a second end 120 of the gain medium 102. In one embodiment, the end 120 is coated so that it is reflective at the pump energy wavelength, while transmissive at a resonant mode of the system 100. In this manner, the pump energy that is unabsorbed at the second end 120 is redirected back through the gain medium 102 to be absorbed.

The pump module 104 produces the pump energy 108 within an operating wavelength range of the gain medium 102. The laser resonator 106 is configured to generate a harmonic of the laser light 112 output from the gain medium 102. In one embodiment, the laser resonator 106 includes a non-linear crystal (NLC) 150, such as a lithium borate (LBO) crystal or a potassium titanyl phosphate crystal (KTP), for generating a second harmonic of the laser beam 112 emitted by the gain medium 102.

In one embodiment, the gain medium 102 comprises a yttrium-aluminum-garnet crystal (YAG) rod with neodymium atoms dispersed in the YAG rod to form a Nd:YAG gain medium 102. The Nd:YAG gain medium 102 converts the pump light into the laser light 112 having a primary wavelength of 1064 nm. The laser resonator 106 generates the second harmonic of the 1064 nm laser light 164 having a wavelength of 532 nm. One advantage of the 532 nm wavelength is that it is strongly absorbed by hemoglobin in blood and, therefore, is useful in medical procedures to cut, vaporize and coagulate vascular tissue.

In one embodiment, the laser resonator 106 includes a Q-switch 152 that operates to change the laser beam 112 into a train of short pulses with high peak power to increase the conversion efficiency of the second harmonic laser beam.

The laser resonator 106 also includes reflecting mirrors 156, 158 and 162, folding mirror 110, and output coupler 160. The mirrors 110, 156, 158 and 162, and output coupler 160 are highly reflective at the primary wavelength (e.g., 1064 nm). The output coupler 160 is highly transmissive at the second harmonic output wavelength (e.g., 532 nm). The primary wavelength laser beam (e.g., 1064 nm) inside the resonator 106 bounces back and forth along the path between the minors 158 and 162, passing through the gain medium 102 and the non-linear crystal 150 to be frequency doubled to the second harmonic output wavelength (e.g., 532 nm) beam, which is discharged through output coupler 160 as the output laser 164. The Z-shaped resonant cavity can be configured as discussed in U.S. Pat. No. 5,025,446 by Kuizenga, imaging the resonant mode at one end of the gain medium 102 at the non-linear crystal 150. The configuration described is stable and highly efficient for frequency conversion. The configuration shown in FIG. 1 using the Nd:YAG gain medium 102 and a LBO non-linear crystal 150 produces a frequency converted output laser 164 having a wavelength of 532 nm, as indicated above.

An optical coupler 166 is connected to a waveguide, such as an optical fiber 168. In one embodiment, the system 100 includes an optical device 170, which is formed in accordance with embodiments of the invention.

FIG. 2 is an oblique view of the optical device 170 in accordance with embodiments of the invention. In one embodiment, the optical device 170 comprises an optical fiber 172 and a fiber cap 173 comprising a cap body 174. In one embodiment, the optical fiber 172 comprises the distal end of the optical fiber 168 coupled to the optical coupler 166 of the system 100, as shown in FIG. 1. In another embodiment, the optical fiber 172 is a section of optical fiber that can be configured to receive an output laser of a laser system, such as laser 164, through an optical coupling with the optical fiber 168.

It is understood that any suitable optical fiber may be used in the device 170. An exemplary optical fiber 172 of the prior art that can be used to form the optical device 170 is illustrated in the partial side cross-sectional view of FIG. 3. The optical fiber 172 generally comprises a nylon jacket 176, a buffer or hard cladding 178, cladding 180 and a core 182. The cladding 180 is bonded to the core 182. The cladding 180 and core 182 operate as a waveguide that allows electromagnetic energy, such as laser beam 164 (FIG. 1), to travel through the core 182.

In one embodiment, the nylon jacket 176 and the hard cladding 178 are removed from the distal end 184 to expose the cladding 180, as illustrated in the side plan view of FIG. 4 and FIG. 5. FIG. 5 is a side cross-sectional view of the optical fiber of FIG. 4 taken generally along line 5-5. In one embodiment, a tapered section 190 is formed in the distal end 184 of the exposed cladding 180. In one embodiment, the tapered section 190 is defined by a conically shaped exterior surface 192. In one embodiment, the tapered section 190 extends to the terminating end 194 of the cladding 180 and core 182. In one embodiment, the conically shaped exterior surface 192 is coaxial with the central axis 196 of the cladding 180 and the core 182. In one embodiment, the exterior surface 192 of the tapered section 190 is aligned at a taper angle 198 relative to the central axis 196.

The tapered section 190 of the cladding 180 can be formed using any suitable technique. In one embodiment, the cladding 180 is laser machined using, for example, a $CO_2$ laser, to form the tapered section 190. In another embodiment, the tapered section 190 is formed in the cladding 180 using a suitable lathe or diamond lap.

One embodiment of the optical fiber 172 comprises a polished optical surface 200 formed at the terminating end 194 of the exposed cladding 180 and core 182. The polished optical surface 200 can be formed in accordance with conventional techniques. In one embodiment, the polished optical surface 200 is forwardly inclined at an angle 202 to reflect laser light 204 that is transmitted through the core 180 laterally relative to the central axis 196. In one embodiment, the angle 202 is approximately 37-38 degrees relative to the central axis 196, which causes the laser light 204 to be output at an angle 206 of approximately 74-76 degrees relative to the central axis 196.

Figure 6:
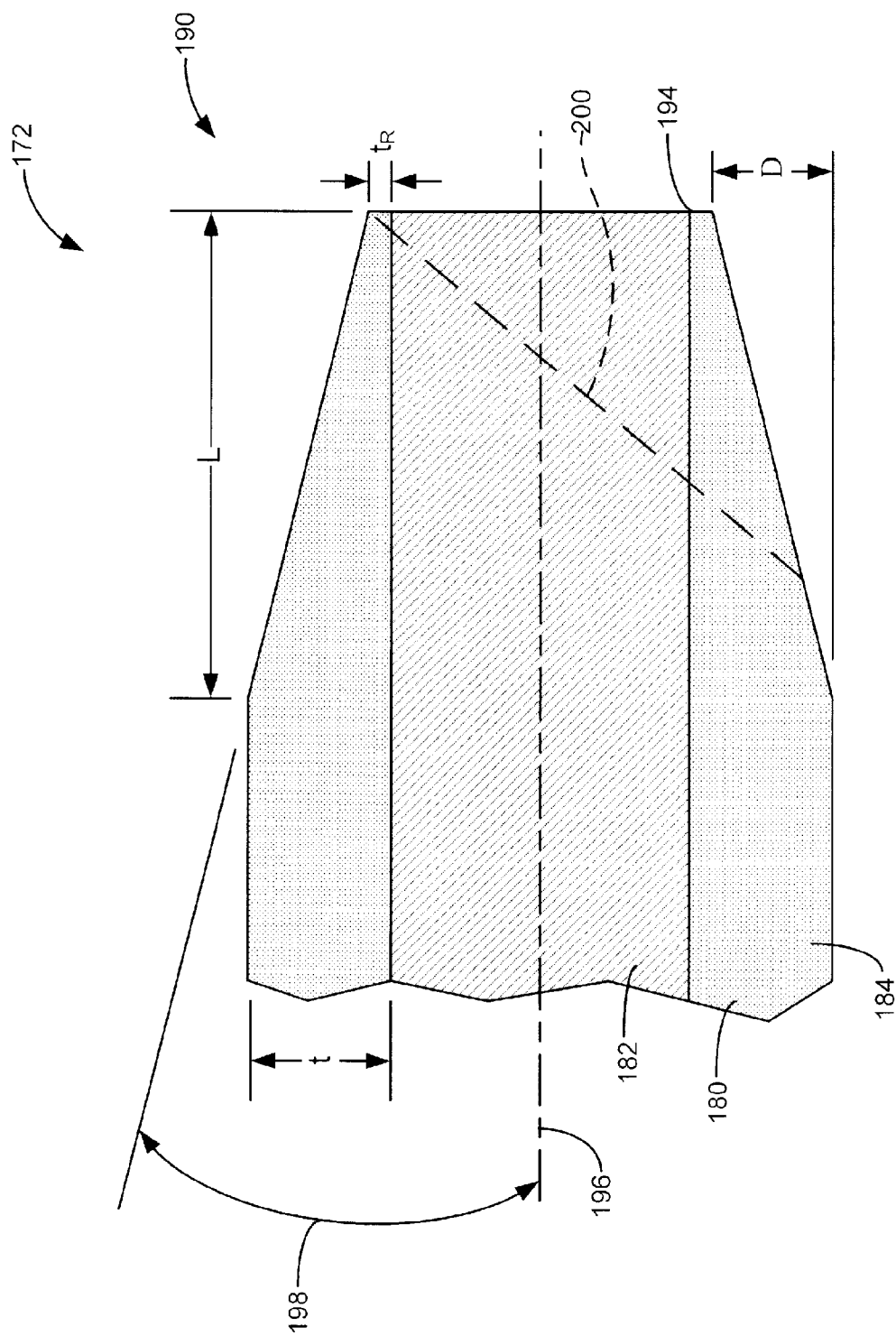
FIG. 6 is a side cross-sectional view of the distal end of an optical fiber in accordance with embodiments of the invention.

FIG. 6 is a side cross-sectional view of the distal end 184 of the optical fiber 172 that illustrates the dimensions of the tapered section 190. The illustration is not to scale and some of the dimensions may be exaggerated. The taper angle 198 that is selected for the fiber 172 depends on the desired length L of the tapered section 190 measured along the central axis 196 and the desired depth of the tapered section 190. In general, the maximum taper angle 198 is equal to arcsine (D/L). The depth D of the tapered section 190 has a maximum equal to the thickness t of the cladding 180. In practice, the depth D of the tapered section 190 will be the thickness t of the cladding less a desired remaining amount of cladding $t_R$, that should remain attached to the core 182, such as, for example, 10-20% of the thickness t of the cladding 180, in order to avoid chipping the core 182. In one embodiment, the thickness t is at least 10 µm. In one embodiment, the taper angle 198 is less than 15 degrees. In one embodiment, the taper angle 198 is less than 10 degrees. In a preferred embodiment, the taper angle 198 is in a range of 4-6 degrees.

When the fiber 172 includes the polished optical surface 200 (represented in phantom) at the terminating end 194, the length L of the tapered section 190 is selected such that the tapered section 190 at least overlaps the optical surface 200. Preferably, the length L of the tapered section 190 is selected to ensure that the tapered section 190 includes a section that completely surrounds the core 182 in a plane that is perpendicular to the central axis 196.

One common optical fiber 172 utilized in laser systems has a core outer diameter of 600 µm and a cladding outer diameter of 840 µm. Another on optical fiber 172 utilized in laser systems has a core outer diameter of 750 µm and a cladding outer diameter of 1050 µm. Other optical fibers may also be used for the fiber 172.

FIGS. 7 and 8 are side plan views of the cap body 174 in accordance with embodiments of the invention. One embodiment of the cap body 174 comprises a closed distal end 210, a bore 212 and an opening 214 to the bore 212 at a proximal end 216. One embodiment of the bore 202 comprises a tapered section 220. In one embodiment, the tapered section 220 is defined by a conically shaped interior surface 222. In one embodiment, the conically shaped interior surface 222 is coaxial to a central axis 224 of the bore 212. In one embodiment, the interior surface 222 of the tapered section 220 is aligned at the taper angle 198 relative to the central axis 224.

In one embodiment, the tapered section 220 extends from the proximal end 216 toward the distal end 210, as shown in FIG. 7. In accordance with this embodiment, the bore may be formed using a conically shaped diamond drill, or by conforming the interior surface of the bore 212 to a cone-shaped mandrel through the application of heat to the cap body 174. In accordance with another embodiment, the tapered section 220 is displaced from the opening 216, as shown in FIG. 8. That is, the tapered section 220 is located between the proximal end 216 and the distal end 210. In accordance with this embodiment, the tapered section 220 may be formed by conforming the bore 212 to a removable (e.g. dissolvable) mandrel that is placed within the bore 212 through the application of heat to the cap body 174.

Embodiments of the optical device 170 include the combination of one or more of the embodiments of the optical fiber 172 and one or more of the embodiments of the cap body 174 described above. FIG. 9 is a side cross-sectional view of embodiments of the optical device 170 comprising the optical fiber 172 illustrated in FIGS. 4 and 5 and the cap body 174 of FIG. 7. FIG. 10 is a side cross-sectional view of embodiments of the optical device 170 comprising the optical fiber 172 illustrated in FIGS. 4 and 5 and the cap body 174 of FIG. 8.

The bore 212 of the cap body 174 is sized to receive the distal end 184 of the optical fiber 172. In one embodiment, the distal end 184 of the optical fiber 172 and the bore 212 are coaxial to a central axis 228 of the device 170. As a result, the conically shaped exterior surface 192 of the tapered section 190 of the optical fiber 172 is parallel to the conically shaped interior surface 222 of the tapered section 220 of the bore 212 due to the alignment of the surfaces 192 and 212 at the same taper angle 198 relative to the central axis 228.

In one embodiment, at least a portion of the tapered section 220 of the bore 212 overlaps a portion of the tapered section 190 of the optical fiber 172, and the corresponding portions of the conical surfaces 192 and 222 engage each other. In one embodiment, the tapered section 220 engages the tapered section 190 over a distance of at least 2.0 millimeters measured in the direction of the central axis 228. While the embodiments of the optical device 170 illustrated in FIGS. 9 and 10 show the tapered section 220 completely overlapping the tapered section 190, it is understood that the tapered section 220 of the bore 212 and the tapered section 190 of the optical fiber 172 could be formed such that a portion of the tapered section 190 extends outside of the bore 212.

One embodiment of the optical device 170 comprises a bond 230 between the optical fiber 172 and the cap body 174, best shown in FIG. 11, which is a magnified view of the portion of the optical device 170 within circle 10 of FIG. 9. In one embodiment, the bond 230 is between at least portions of the overlapping surfaces 192 and 222. In one embodiment, the bond 230 creates a seal between the cladding 180 and the cap body 174.

One embodiment of the bond 230 comprises a fusion of the overlapping surfaces 192 and 222 of the tapered sections 190 and 220. In one embodiment, the cladding 180 and the body cap 174 are formed of silica. In one embodiment, the fusion bond 230 is formed by thermally fusing the overlapping surfaces 192 and 222 together. Conventional thermal fusion techniques may be used to form the thermal fusion bond 230.

In accordance with another embodiment, the fusion bond 230 is formed by chemically fusing the overlapping surfaces 192 and 222 together. Chemically fusing the surfaces 192 and 222 together eliminates significant thermal stresses that can develop from thermal fusion bonding, which can cause the optical device 170 to fail. Additionally, thermal fusion bonding can optically distort surfaces of the device 170, which can degrade performance.

In one embodiment, the chemical fusion bond 230 is formed through a hydroxide-catalyzed hydration and dehydration. In this method, hydroxide ions contained, for example, in an aqueous solution, are applied to at least one of the surfaces 192 and 212 and the surfaces 192 and 212 are then placed sufficiently close to each other to form at least one chemical bond between them. Suitable hydroxides for the aqueous solution include the ionic salts NaOH, KOH, NH.sub.4 OH, sodium ethoxide, and potassium ethoxide. A detailed explanation of this method of chemically fusing two silicate surfaces together is provided in U.S. Pat. No. 6,284,085, which is incorporated herein by reference in its entirety. Other chemical fusion techniques can also be used to fuse the surfaces 192 and 212 together and form the fusion bond 230.

In one embodiment, the terminating end 194 of the optical fiber 172 includes the forward inclined polished optical surface 200, which is configured to reflect laser light 204 transmitted through the core 182 laterally relative to the central axis 196 (FIG. 5) of the fiber 172 or central axis 228 of the optical device 170, as shown in FIGS. 9 and 10. The closed end 210 of the cap body 174 encloses an air chamber 231. The air interface with the polished optical surface 200 causes total or near total reflection of the laser light 204 within the core 182. In one embodiment, the fusion bond 230 is located between the optical surface 200 and the transmitting surface 232 of the cap body 174. The fusion bond 230 (i.e., chemical or thermal) allows the reflected laser light 204 to pass through the surfaces 192 and 222 without significant internal reflection.

In one embodiment, the bond comprises an adhesive. In one embodiment, the adhesive comprises at least one fluorocarbon polymer. The term "fluorocarbon polymer," as used herein, is a perfluoro or fluorocarbon polymer (fluoropolymer) or oligomer. Exemplary fluorocarbon polymers suitable for use in forming the adhesive are marketed under the trade names Cytop™, Krytox®, Fomblin® Z DOL, and others.

Figure 12:
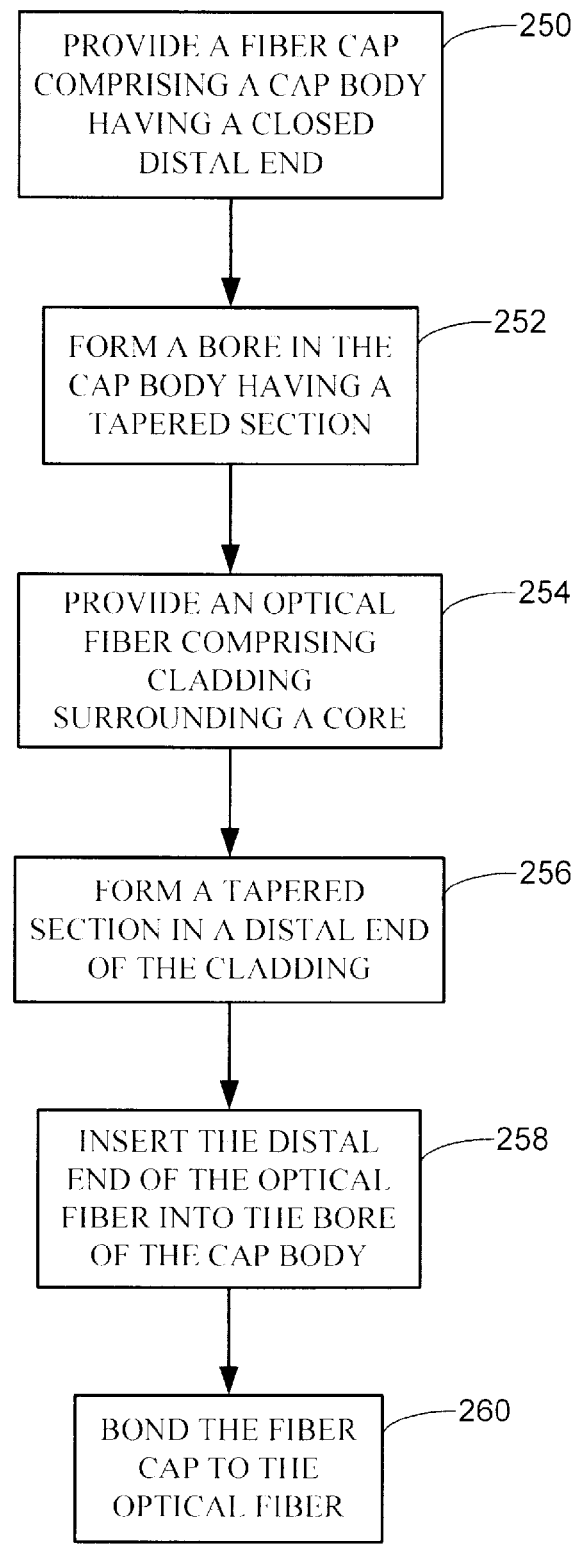
FIG. 12 is a flowchart illustrating a method of manufacturing an optical device in accordance with embodiments of the invention.

FIG. 12 is a flowchart illustrating a method of manufacturing an optical device in accordance with embodiments of the invention. At 250, a fiber cap 173 comprising a cap body 174 having a closed distal end 210, in accordance with the embodiments described above with reference to FIGS. 2 and 7-10. At 252, a bore 212 having a tapered section 220 is formed in the cap body 174, in accordance with one or more of the embodiments described above. At 254, an optical fiber 172 comprising cladding 180 surrounding a core 184 is provided. A tapered section 192 is formed in a distal end 184 of the cladding 180, at 256, in accordance with one or more of the embodiments described above. At 258, the distal end 184 of the optical fiber 172 is inserted into the bore 212 of the cap body 174, such that the tapered section 220 of the bore 212 overlaps the tapered section 190 of the cladding 180. At 260, the fiber cap 173 is bonded to the optical fiber 172, in accordance with one or more of the embodiments described above.

Although the present invention has been described with reference to preferred embodiments, workers skilled in the art will recognize that changes may be made in form and detail without departing from the spirit and scope of the invention.

What is claimed is:
1. An optical device comprising:
   a fiber cap comprising a cap body having a closed distal end and a bore having a tapered section;

an optical fiber comprising cladding surrounding a core, wherein a distal end of the cladding comprises a tapered section that engages the tapered section of the bore; and a bond between the engaging tapered sections of the fiber cap and the optical fiber.

2. The device of claim 1, wherein the bore and the optical fiber are coaxial to a central axis.

3. The device of claim 2, wherein:
the tapered section of the bore is defined by a conically shaped interior surface and the tapered section of the cladding is defined by a conically shaped exterior surface; and
at least a portion of the interior surface engages a portion of the exterior surface.

4. The device of claim 3, wherein the conically shaped interior and exterior surfaces are both aligned at a taper angle relative to the central axis of the bore and the optical fiber.

5. The device of claim 4, wherein the bond comprises a portion of the interior surface fused to a portion of the exterior surface.

6. The device of claim 4, wherein the bond comprises an adhesive.

7. The device of claim 4, wherein the taper angle is within a range of 4-6 degrees.

8. The device of claim 3, wherein the engaging portions of the interior and exterior surfaces form a ring that surrounds the core.

9. The device of claim 3, wherein the tapered section of the bore engages the tapered section of the cladding over a distance of at least 2.0 millimeters measured in the direction of the central axis.

10. The device of claim 1, wherein the tapered section of the bore extends from an opening to the bore at a proximal end of the fiber cap toward the distal end of the fiber cap.

11. The device of claim 1, wherein the tapered section of the bore is displaced from an opening to the bore at a proximal end of the fiber cap.

12. The device of claim 3, wherein:
the closed distal end of the cap body encloses an air chamber; and
the distal end of the optical fiber has a terminating end that is exposed to the air chamber.

13. The device of claim 12, wherein the core of the terminating end comprises a forwardly inclined surface.

14. The device of claim 13, wherein:
an exterior surface of the fiber cap comprises a transmitting surface proximate to the forwardly inclined surface; and
laser light transmitted through the core reflects off the forwardly inclined surface and through the transmitting surface.

15. The device of claim 14, wherein the bond comprises a portion of the interior surface fused to a portion of the exterior surface at a location that is between the transmitting surface and the forwardly inclined surface.

16. The optical device of claim 1, wherein the cap body comprises silica.

17. A fiber optic cap comprising a cap body formed of silica having a closed distal end and a bore configured to receive a distal end of an optical fiber, the bore having a tapered section defined by a conically shaped interior wall of silica aligned at a taper angle relative to a central axis of the bore, wherein the taper angle is less than 15 degrees.

18. The device of claim 17, wherein the tapered section of the bore extends from an opening to the bore at a proximal end of the cap body toward the closed distal end.

19. The device of claim 17, wherein the tapered section of the bore is displaced from an opening to the bore at a proximal end of the cap body.

20. A method of forming an optical device comprising:
providing a fiber cap comprising a cap body having a closed distal end;
forming a bore in the cap body having a tapered section defined by a conically shaped interior surface aligned at a taper angle relative to a central axis of the bore;
providing an optical fiber comprising cladding surrounding a core;
forming a tapered section in a distal end of the cladding, the tapered section defined by a conically shaped exterior surface aligned at the taper angle relative to a central axis of the optical fiber;
inserting the distal end of the optical fiber into the bore of the cap body, wherein the tapered section of the bore overlaps the tapered section of the cladding; and
bonding the fiber cap to the optical fiber comprising bonding a portion of the overlapping tapered sections together.

21. The method of claim 20, wherein bonding the fiber cap to the optical fiber comprises chemically fusing the exterior surface of the tapered section of the optical fiber to the interior surface of the tapered section of the bore.

22. An optical device comprising:
a fiber cap comprising a cap body having a closed distal end and a bore having a tapered section;
an optical fiber comprising cladding surrounding a core, wherein a distal end of the cladding comprises a tapered section that engages the tapered section of the bore, and the core includes a forwardly inclined surface at a terminating end of the optical fiber; and
a bond between the engaging tapered sections of the fiber cap and the optical fiber;
wherein:
the closed distal end of the cap body encloses an air chamber; and
the forwardly inclined surface of the core is exposed to the air chamber and reflects laser light transmitted through the core laterally relative to a central axis of the optical fiber.

23. The optical device of claim 22, wherein the cap body comprises silica.

* * * * *

UNITED STATES PATENT AND TRADEMARK OFFICE
CERTIFICATE OF CORRECTION

PATENT NO. : 8,899,844 B2
APPLICATION NO. : 12/627247
DATED : December 2, 2014
INVENTOR(S) : Novak, Jr. et al.

Page 1 of 1

It is certified that error appears in the above-identified patent and that said Letters Patent is hereby corrected as shown below:

IN THE SPECIFICATION:
In Column 3, Line 24, delete "minors" and insert -- mirrors --, therefor.

In Column 4, Line 22, delete "core 180" and insert -- core 182 --, therefor; In Column 4, Line 65, delete "bore 202" and insert -- bore 212 --, therefor.

In Column 5, Line 12, delete "opening 216," and insert -- opening 214, --, therefor; In Column 5, Line 35, delete "surfaces 192 and 212" and insert -- surfaces 192 and 222 --, therefor.

In Column 6, Line 10, delete "the surfaces 192 and 212 and the surfaces 192 and 212 are" and insert -- the surfaces 192 and 222 and are --, therefor; In Column 6, Line 50, delete "core 184" and insert -- core 182 --, therefor; In Column 6, Line 51, delete "section 192" and insert -- section 190 --, therefor.

Signed and Sealed this
Twelfth Day of January, 2016

Michelle K. Lee
*Director of the United States Patent and Trademark Office*